United States Patent Office

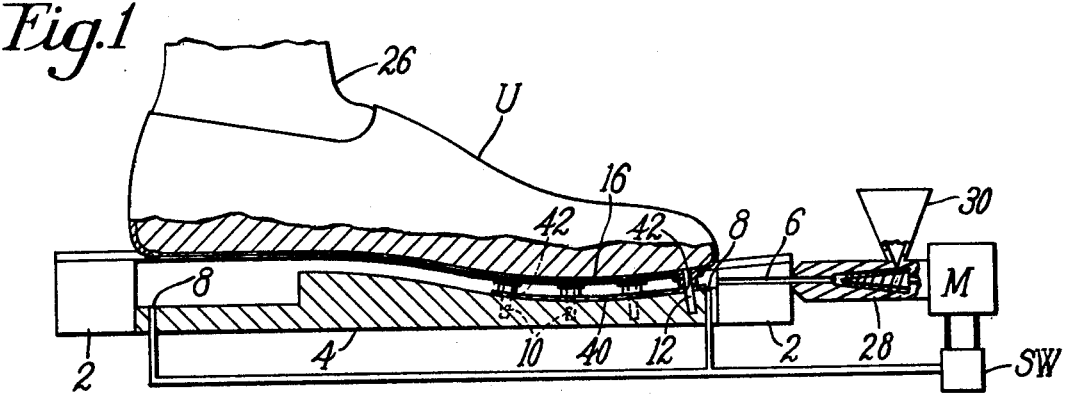
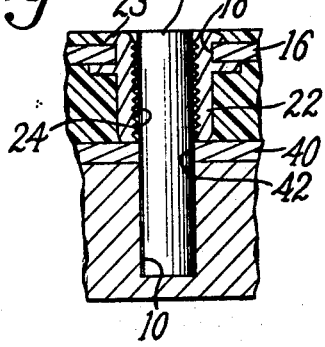
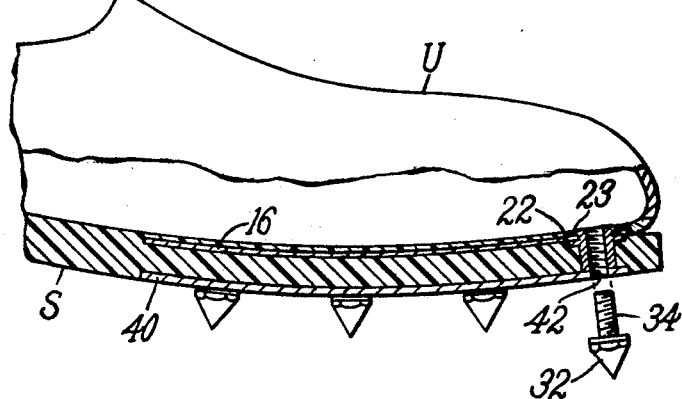
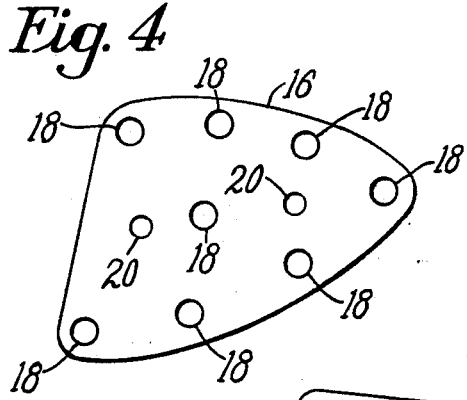
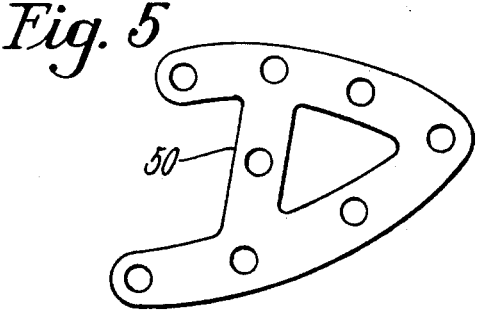
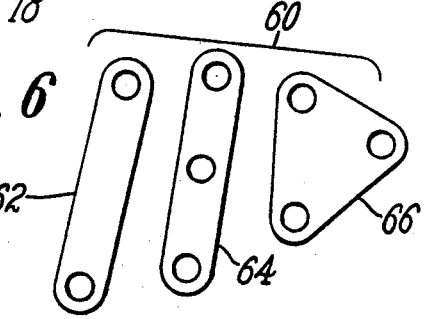
*Inventor*
Thomas J. Innocenti
By his Attorney

3,577,503
Patented May 4, 1971

3,577,503
PROCESS OF MAKING ATHLETIC SHOES WITH INJECTION MOLDED SOLE
Thomas J. Innocenti, Beverly, Mass., assignor to USM Corporation, Flemington, N.J.
Original application Nov. 13, 1967, Ser. No. 681,997. Divided and this application Dec. 5, 1968, Ser. No. 781,346
Int. Cl. A43d 65/02; B29h 7/08
U.S. Cl. 264—244     1 Claim

ABSTRACT OF THE DISCLOSURE

Method for making an athletic shoe with an injection molded sole having means for receiving spikes or other projections to be attached to the sole, said means being embedded in the sole.

CROSS REFERENCE TO RELATED APPLICATION

This is a division of application Ser. No. 681,997 filed on Nov. 13, 1967 in the name of Thomas J. Innocenti, now abandoned.

BACKGROUND OF THE INVENTION

Field of the invention

This invention relates to athletic or sport shoes and is directed more particularly to a method for making a shoe having an injection molded sole, which sole has embedded therein means for receiving spikes or other such members.

Description of the prior art

It is known in the prior art to provide a leather sole having means located therein for threadedly receiving spikes or cleats. This construction usually involves a sole having multiple layers of material including one layer of sheet metal havinng female threaded members attached thereto.

It is also known to provide a separate sole for sport shoes which is injection molded and which has embedded therein a series of spikes which sole is attached to the shoe bottom by a subsequent operation.

While the latter sport shoe sole enjoys the advantages of injection molding, it suffers from the fact that the spikes are not removable, but are permanently embedded in the sole.

SUMMARY OF THE INVENTION

It is an object of the present invention to provide a method for making an athletic shoe with an injection molded sole having means for threadedly receiving spike members.

Another object of the invention is to provide a method for making such a shoe, which shoe permits removal of the spike members from the molded sole.

With the above and other ebjects in view, as will hereinafter appear, the present invention in one aspect thereof contemplates a method for making a sport shoe having a sole directly molded onto an upper, the sole being adapted to releasably retain spike members or the like.

The above and other features of the invention will now be more particularly described with reference to the accompanying drawings and pointed out in the claim. It will be understood that the particular method embodying the invention is described by way of illustration only and not as a limitation of the invention. The principles and features of this invention may be employed in various and numerous embodiments without departing from the scope of the invention, such as in making working shoes where a particular sole attachment is required for particular conditions, as in mountain climbing and the like.

BRIEF DESCRIPTION OF THE DRAWINGS

FIG. 1 is an elevational view, partly in section, of an illustrative mold assembly used in executing the present method, showing an upper in position for having a sole injection molded thereon;

FIG. 2 is a detailed elevational view in section and illustrating a step in the inventive process;

FIG. 3 is an elevational, partly sectional view of a sport shoe having a sole molded in accordance with the method illustrated in FIG. 1;

FIG. 4 is a plan view of a retaining means used in carrying out the inventive process and forming a portion of the shoe; and FIGS. 5 and 6 are plan views of illustrative alternative retaining plates.

DESCRIPTION OF THE PREFERRED EMBODIMENT

Referring to FIG. 1, it will be seen that the inventive process may be carried out on an ordinary injection sole molding machine schematically illustrated and including side mold members 2 and a bottom mold member 4. The side mold members 2 (one shown in the drawings) may be machined so as to cooperatively provide an injection inlet 6, or alternatively, one or more injection inlets 6 may extend entirely through one or more of the mold members. The bottom mold member 4 may be provided with air tell-tale holes 8, as is well known in the art. The mold assembly as thus far described is of the type customarily used in injection molding soles directly onto shoe uppers.

To facilitate the placing of a spike retaining plate within the mold cavity, the bottom mold member is provided with a series of bores 10 (FIG. 1) in the mold cavity surface of the member 4. For illustrative purposes the bores 10 are shown in the drawings as being disposed in the forepart area of the mold. However, it will be apparent that the process as herein described has equal application to the heel area of the mold for facilitating the attachment of spikes or cleats to the heel of a sport shoe.

As may be seen in FIG. 2, locating pins 12 are disposed in the bores 10. A support means, which may be a retaining plate 16, as shown in FIG. 4, is provided having a series of holes 18 arranged therein in accordance with the arrangement of spikes desired on the shoe bottom. In addition, other holes 20 are provided in the plate 16 to permit the flow of injection molding material therethrough.

Referring to FIG. 2, it may be seen that the plate 16 is provided with internally threaded female members 22 which are connected to the plate 16 and extend through the holes 18. The female members 22 are provided with internal threads 24 for receiving spike members to be described below.

A tread member 40 of leather or like material having holes 42 (FIGS. 1–3) therethrough is disposed in the mold cavity and on the mold cavity surface of the bottom mold member 4, the holes 42 being in alignment with the bores 10 in the bottom mold member 4. The locating pins 12 are disposed in the bores 10 and are received by the holes 42. The retaining plate 16, having the members 22 attached thereto, is placed upon the tread insert 40 with the members 22 aligned with the holes 42 and receiving the locating pins 12 (FIG. 2).

To enclose the mold cavity and complete the mold assembly, a footform 26 having a footwear upper U mounted thereon is brought into engagement with the side mold members 2, as may be seen in FIG. 1. The retaining plate 16 may be in engagement with the upper U or may be spaced from the upper U, as for example, by the upper flanges 23 (FIGS. 2 and 3) of the female thread members 22. A plasticator 28 to which plastic material, such as a synthetic resinous material or compound commonly used for injection molding shoe soles, is fed from a hopper 30 and which is rotated by a motive means M forces molten material into the mold cavity formed by the foot-form 26 and upper U, the side mold members 2 and the bottom mold member 4. The molten material enters the mold cavity through the injection inlet 6 until the mold cavity is filled with the molding material. The injected material flows around the retainer plate 16 and through the holes 20 to surround the plate 16 and the members 22 and also to cover the tread member 40.

After the elapse of sufficient cooling time, the mold assembly is opened and the mold sole is removed from the mold cavity. Referring to FIG. 3, it may be seen that a sole *s* is molded directly to the upper U and has embedded therein the retaining plate 16 and female members 22. Spike members 32 having external threads 34 may be screwed into the members 22, as shown in FIG. 3. In the event it is desirable to provide the shoe with a different type spike or other projection, the spikes 32 need only be unscrewed from the members 22 and replaced with members of the desired configuration. The athletic shoe made by the present process includes a tread member which may be of leather or other suitable material.

Referring to FIGS. 5 and 6, it will be seen that the support means for the members 22 may be, in place of the plate 16, a frame member 50 which offers more flexibility than the retainer plate 16. The support means may comprise a plurality of support members 60 which may include strip members 62, 64 for retaining two or more members 22, or other geometric configurations such as a triangularly shaped support member 66. For maximum flexibility, each female member 22 may be attached to a separate support member.

Having thus described my invention, what I claim is new and desire to secure by Letters Patent of the United States is:

1. A method for making athletic shoe soles comprising
providing a mold assembly having a shoe sole forming cavity with an open top and a bottom mold member having a shoe bottom forming surface
providing locating pins extending into said cavity from the bottom forming surface
providing a support plate having female spike receiving members
placing a tread insert on said bottom forming surface with holes in the insert received on said pins
placing said plate over the tread insert with said members received on said pins and with the lower end of said members engaging the inner surface of the tread insert
closing the open top of the cavity with a lasted shoe bottom which engages the upper end of said members
introducing molten soling material into said cavity to flow over the inner surface of the tread insert and around said members and said plate whereby to form a molded shoe sole having embedded spike receiving members covered by an exposed tread insert having holes through which spikes may be inserted in said members.

References Cited

UNITED STATES PATENTS

| | | | |
|---|---|---|---|
| 3,109,701 | 11/1963 | Jacquet | 264—263X |
| 3,178,496 | 4/1965 | Ferreira | 264—328X |
| 3,187,073 | 6/1965 | Bingham | 264—274X |
| 3,287,485 | 11/1966 | McCord | 264—263 |
| 3,445,559 | 5/1969 | Siteman | 264—263 |

ROBERT F. WHITE, Primary Examiner

R. R. KUCIA, Assistant Examiner

U.S. Cl. X.R.

12—142; 264—278, 328